United States Patent Office 3,412,046
Patented Nov. 19, 1968

3,412,046
CATALYZED POLYEPOXIDE-ANHYDRIDE
RESIN SYSTEMS
William L. Payne, Olean, N.Y., assignor to The Dexter
Corporation, a corporation of Connecticut
No Drawing. Filed July 1, 1965, Ser. No. 468,924
12 Claims. (Cl. 260—2)

ABSTRACT OF THE DISCLOSURE

A rapidly self-curing resinous composition comprising a polyepoxide having an epoxide

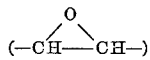

equivalency greater than 1.0 an amount of polycarboxylic acid anhydride to provide 0.6 to 1.1 and preferably 0.8 to 1.1 equivalents of anhydride per epoxide equivalent, and a catalyst consisting of an aryl sulfonium salt in the proportion of about 0.5 to 50 milliequivalents per equivalent of epoxide.

The catalyzed hardener, which is stable for a year or more at room temperature and moderately elevated temperatures, is a homogeneous mixture of a polycarboxylic acid anhydride and an aryl sulforium salt in proportions to provide about 0.5 to 50 milliequivalents of aryl sulfonium salt per 0.6 to 1.1 equivalent of anhydride.

---

Anhydride cured epoxy resins have many desirable chemical and physical properties, but a deterent to more extensive use of such systems is the relatively long heating at substantially elevated temperatures normally required to effect complete curing. Furthermore, these systems, when cured in association with conventional metallic salt or tertiary amine catalysts, have exhibited considerable resin homopolymerization, necessitating the use of anhydride in amounts somewhat below the theoretical amount, i.e. about .8 to .9 anhydride equivalent for each 1.0 epoxy equivalent. To the extent that homopolymerization takes place, it detracts from the properties which can be achieved with complete reaction between the resin and anhydride.

It has now been discovered, in accordance with the present invention, that unusually rapid cure of polyepoxide-anhydride systems can be achieved, while at the same time substantially eliminating homopolymerization when there is employed as catalyst or activator for such systems, an aryl sulfonium salt, and preferably a triaryl sulfonium salt.

The use of sulfur containing compounds, such as mercaptans, sulfides, and heterocyclic thio-compounds as activators for epoxy resin-anhydride systems has been disclosed in United States Patent No. 3,114,731. This patent, hovever, makes no mention of sulfonium salts, and it will be apparent from the results shown in the illustrative examples hereinafter appearing, that the aryl sulfonium salts provide a catalytic action which is totally different in magnitude from that of the previously used sulfur compounds.

The new activators or catalysts are aryl sulfonium salts of the general formula:

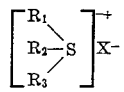

wherein $R_1$, $R_2$ and $R_3$ are aryl organic radicals, or these radicals with substituents, such as alkoxy groups, cycloalkoxy groups, aryloxy groups, OH, CHO, CO, and CN, as well as unsaturated varients thereof; S is sulfur, and X is an anion derived from an acid including inorganic acids, such as hydrochloric, hydrobromic, nitric, sulfuric, sulfurous or phosphoric acids, and organic acids, such as acetic, propionic, butric, oxalic acids.

The following are some specific examples of such salts:

triphenylsulfonium chloride,
triphenylsulfonium nitrate,
triphenylsulfonium acetate,
tritolylsulfonium bromide,
trixylylsulfonium propionate.

Closely related compounds containing no aryl groups, such as trimethylsulfonium chloride and trimethylsulfonium iodide exhibit catalytic activity only to the extent of "regular" sulfur containing compounds of the type disclosed in said United States Patent No. 3,114,731; and as shown in the illustrative examples hereinafter appearing, do not share the unique activity of the aryl sulfonium salts. This difference in activity is surprising, since in other fields, aryl and non-aryl sulfonium salts behave similarly. For example, in United States Patent No. 3,028,361, where sulfonium salts are shown to be useful in the stabilizing of polyesters and accelerating their polymerization in the presence of peroxide catalyst, aryl and non-aryl sulfonium salts are indicated to have the same activity.

In the catalyzing of polyepoxide-anhydride systems, the polyaryl solfonium salts are considered superior, and especially good results are obtained with triarylsulfonium salts, such as the triphenylsulfonium salts.

The polyepoxide-anhydride systems in which the new catalysts can be employed, are well known in the art, and have been extensively described in publications, including patent publications, such as United States Patent No. 2,768,153 and No. 3,114,731; and it is to be understood that the present invention can be practiced using any of the polyepoxides which have an epoxide

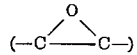

equivalent greater than 1.0, and with any of the polycarboxylic acid anhydrides disclosed in said patents. The polyepoxides may vary considerably in molecular weight, and include both liquid and solid resins. Similarly, the polycarboxylic acid anhydrides can be normally liquid, or solid materials. In many uses and applications of such polyepoxide-anhydride systems, it is preferable to employ combinations of resin and anhydride which are either liquid at room temperature, or can be liquefied by heating to temperatures of the order of 100 to 150° C.

The proportion of anhydride to polyepoxide is best expressed in terms of equivalents of anhydride per equivalent of polyepoxide; and on this basis, the proportions of anhydride should be 0.6 to 1.1, and preferably 0.8 to 1.1 equivalents per equivalent of epoxide. Furthermore, since the new catalysts eliminate resin homopolymerization, it is practical to use proportions corresponding as closely as possible to 1.0 equivalent of anhydride per equivalent of epoxide.

In these resin systems, the amount of aryl sulfonium salt catalyst employed may vary from about 0.02 to 10%, and preferably 0.1 to 5% based on the weight of polyepoxide. Here again it is more meaningful to express proportions in terms of equivalents of catalyst per equivalent of polyepoxide. On this basis, the proportion of catalyst is preferably within the range of about 0.5 to 50 milliequivalents per epoxide equivalent. Within this range the preferred amount will depend primarily on the speed with which it is desired for a resin system to gel, increase in the amount of catalyst reducing the gel time.

In a system having a fixed epoxide content and different additives are included for evaluation of catalytic activity, it is important that the various additives be present in the same additive equivalent:epoxide equivalent ratio. For this reason, amounts of additives employed in the accompanying examples are expressed in milliequivalents. (Thus, 2 milliequivalents of a substance having an equivalent weight of 300 would be 600 mgm. or 0.6 gm. of the substance.)

In preparing for use in resin systems in accordance with the present invention, the catalyst is preferably first blended with the polycarboxylic acid anhydride, with heating if necessary, to form a homogeneous composition. This is then combined with the resin at a temperature at which both components are sufficiently fluid to permit complete mixing, and the composition is ready for casting, laminating, encapsulating, or similar practical application.

It should be noted in this connection, that the anhydride catalyst mixture is stable at room temperature and moderately elevated temperatures for long periods of time, i.e., a year or longer, and that accordingly, the anhydride-catalyst mixture can constitute a practical article of commerce as a partially prepared material for use in epoxy resin systems.

Epoxy resin compositions in accordance with the present invention can be supplemented by compatible coloring agents, extended by a variety of fibrous and finely divided inert fillers and modified by the inclusion of plasticizers, resins, fire retardants, electrically conductive materials, and the like, as is common with other epoxy resin systems.

The following examples will serve to demonstrate the usual catalytic activity of aryl sulfonium salts on typical polyepoxide-anhydride systems in accordance with the present invention, but it is to be understood that these examples are given by way of illustration and not of limitation.

In each of the examples, a total of fourteen sulfur containing compounds, including three arylsulfonium salts are tested for catalytic activity. These compounds and their equivalent weights are as follows:

| Catalyst: | Equivalent wt. |
|---|---|
| Triphenylsulfonium chloride | 298.8 |
| Triphenylsulfonium nitrate | 325.3 |
| Triphenylsulfonium acetate | 322.3 |
| Trimethylsulfonium iodide | 204.8 |
| Phenyl sulfide | 186.3 |
| Phenyl disulfide | 218.3 |
| Phenyl sulfoxide | 202.3 |
| Phenyl sulfone | 218.3 |
| Benzyl sulfide | 214.3 |
| n-Butyl sulfide | 146.3 |
| Lauryl mercaptan | 202.4 |
| Thiophene | 84.1 |
| 2,2'-thiodiethanol | 122.2 |
| Dimethyl sulfoxide | 78.1 |
| O-N-dimethylaminomethyl phenol (Dmp. 10) | 151.2 |
| Benzyldimethyl amine | 135.2 |

EXAMPLE I

To a clean quarter-pint can was added 1.34 milliequivalents of the catalyst under test. To this was added sufficient nadic methyl anhydride (Methylbicyclo (2.2.1) heptene-2,3 dicarboxylic anhydride) to give a total weight of 20 grams. The materials were mixed and placed in a 100° C. oven for 30 minutes to preheat the hardener. The can was removed from the oven and 20 grams of a liquid epoxy resin which is a condensate of epichlorohydrin and bisphenol A having an epoxide equivalent weight of about 185, also preheated to 100° C., was added. The materials were stirred until mixed. Thirty-five (35) grams of the mixture was transferred to an aluminum weighing dish. The dish was placed in the 100° C. oven and the gel time noted as that point where the composition became a hard glass. The comparative results are given in the table hereinafter appearing.

EXAMPLE II

To a clean quarter-pint can was added 2.68 milliequivalents of the catalyst under test. To this was added sufficient melted hexahydrophthalic anhydride to give a total weight of 20 grams. The materials were mixed and placed in a 100° C. oven for 30 minutes to preheat the hardener. The can was removed from the oven and 20 grams of the liquid epoxy resin as employed in Example I, also preheated to 100° C., was added. The materials were stirred until mixed. Thirty-five (35) grams of the mixture was transferred to an aluminum weighing dish. The dish was placed in the 100° C. oven and the gel time noted as that point where the composition became a hard glass. The comparative results are given in the table hereinafter appearing.

EXAMPLE III

To a clean quarter-pint can was added 1.34 milliequivalents of the catalyst under test. To this was added sufficient melted hexahydrophthalic anhydride to give a total weight of 22 grams. The materials were mixed and placed in a 100° C. oven for 30 minutes to preheat the hardener. The can was removed from the oven and 20 grams of 3,4 - epoxy - 6 - methylcyclohexylmethyl - 3,4-epoxy-6-methylcyclohexanecarboxylate, also preheated to 100° C., was added. The materials were stirred until mixed. Thirty-five (35) grams of the mixture was transferred to an aluminum weighing dish. The dish was placed in the 100° C. oven and the gel time noted as that point where the composition became a hard glass. The comparative results are given in the following table:

| Catalyst | Gel Time at 100° C., Minutes | | |
|---|---|---|---|
| | Ex. I | Ex. II | Ex. III |
| Triphenylsulfonium chloride | 17 | 3 | 11 |
| Triphenylsulfonium nitrate | 21 | 8 | 13 |
| Triphenylsulfonium acetate | 23 | 4 | 15 |
| Trimethylsulfonium iodide | >360 | >360 | >360 |
| Phenyl sulfide | >360 | >360 | >360 |
| Phenyl disulfide | >360 | >360 | >360 |
| Phenyl sulfoxide | >360 | >360 | >360 |
| Phenyl sulfone | >360 | >360 | >360 |
| Benzyl sulfide | >360 | >360 | >360 |
| n-Butyl sulfide | >360 | >360 | >360 |
| Lauryl mercaptan | >360 | >360 | >360 |
| Thiophene | >360 | >360 | >360 |
| 2,2'-thiodiethanol | >360 | >360 | >360 |
| Dimethyl sulfoxide | >360 | >360 | >360 |
| DMP-10 | 72 | 9 | 92 |
| Benzyldimethyl amine | 52 | 10 | 57 |

It is significant to note from the foregoing examples that the trimethylsulfonium salt shows the same relative lack of catalytic activity as the various other sulfur containing compounds following it in the table, and that the unusual rapid cure is attained only with the aryl sulfonium salts.

Aryl sulfonium salts may be employed as substitutes for tertiary amine and metallic catalysts currently being used in anhydride cured epoxy resin systems. Proper catalyst level adjustment will give approximately the same pot life and cure schedules currently being obtained. In some instances, adjustment of the anhydride to epoxide ration to 1.0 results in cured products with improved physical characteristics thus taking advantage of the fact that the aryl sulfonium salts cause essentially no epoxy resin homopolymerization.

Most common tertiary amine catalyzed anhydride cured epoxy resin systems require a minimum cure temperature of 90–100° C. With aryl sulfonium salts, systems have been formulated which will cure within 16 hours at temperatures as low as 60° C. The ability to cure at these low temperatures has two primary advantasge. The system has the lowest possible peak exotherm temperature which results in reduced shrinkage of the cured casting. Secondly, it offers the ability to encapsulate temperature sensitive components. The ability to cure at these low temperatures in no way detracts from the ability to cure at the more elevated temperatures usually employed with such anhydride cured systems. In fact, the practical curing temperature for the new compositions can vary from about 60° C. to 200° C.

It is a further advantage of aryl sulfonium salts that for two identically formulated systems possessing the same gel time, one catalyzed with a tertiary amine such as DMP–10 or benzyldimethyl amine and the other catalyzed with aryl sulfonium salt, the sulfonium salt containing system will have a longer useful pot life.

It is well known to those familiar with the field of epoxy resin formulation that tertiary amine catalysts in anhydride cured epoxy resin systems cause considerable discoloration during cure. This is not true with some aryl sulfonium salts. Thus, a system based on a colorless anhydride such as hexahydrophthalic anhydride, a high purity epoxy resin and catalyzed with triphenylsulfonium chloride can be cured to an essentially colorless casting. This property of not discoloring during cure is of further advantage when doing color match work.

The aryl sulfonium salt catalyzed compositions of the foregoing examples are particularly suited for use in making high temperature fiberglass and other laminated structures. Also in the coating or encapsulating of electrical components, these compositions alone or supplemented with coloring agents, filler components, or conventional modifiers, are highly practical because of their rapid curing time, improved handling and physical properties and improved color characteristics. The practical applications of the aforementioned characteristics will be obvious to those skilled in the art.

Various changes and modifications in the novel catalyzed polyepoxide-anhydride resin systems herein disclosed will occur to those skilled in the art, and to the extent that such changes and modifications are embraced by the appended claims, it is to be understood that they constitute part of the present invention.

I claim:
1. A rapidly self-curing resinous composition comprising a polyepoxide having an epoxide

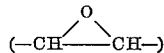

equivalency greater than 1.0, an amount of polycarboxylic acid anhydride to provide 0.6 to 1.1 and preferably 0.8 to 1.1 equivalents of anhydride per epoxide equivalent, and a catalyst consisting of an aryl sulfonium salt in the proportion of about 0.5 to 50 milliequivalents per equivalent of epoxide.

2. A rapidly self-curing resinous composition as defined in claim 1, wherein the catalyst is a triaryl sulfonium salt.

3. A rapidly self-curing resinous composition as defined in claim 1, wherein the catalyst is a triphenyl sulfonium salt.

4. A rapidly self-curing resinous composition as defined in claim 1, wherein the catalyst is triphenyl-sulfonium chloride.

5. A rapidly self-curing resinous composition as defined in claim 1, wherein the catalyst is triphenylsulfonium nitrate.

6. A rapidly self-curing resinous composition as defined in claim 1, wherein the catalyst is triphenylsulfonium acetate.

7. A catalyzed hardener for use in the curing of polyepoxide resin systems wherein the polyepoxide has an epoxide

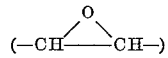

equivalency greater than 1.0, said catalyzed hardener consisting essentially of a homogeneous mixture of a polycarboxylic acid anhydride and an aryl sulfonium salt in proportions to provide about 0.5 to 50 milliequivalents of aryl sulfonium salt per 0.6 to 1.1 equivalent of anhydride said catalyzed hardener being characterized as stable for at least one year at room temperature and moderately elevated temperatures.

8. A catalyzed hardener as defined in claim 7, wherein the aryl sulfonium salt is a triarylsulfonium salt.

9. A catalyzed hardener as defined in claim 7, wherein the aryl sulfonium salt is a triphenylsulfonium salt.

10. A catalyzed hardener as defined in claim 7, wherein the aryl sulfonium salt is triphenylsulfonium chloride.

11. A catalyzed hardener as defined in claim 7, wherein the aryl sulfonium salt is triphenylsulfonium nitrate.

12. A catalyzed hardener as defined in claim 7, wherein the aryl sulfonium salt is triphenylsulfonium acetate.

References Cited

UNITED STATES PATENTS 2,768,153  10/1956  Shokal.

WILLIAM H. SHORT, *Primary Examiner.*

T. D. KERWIN, *Assistant Examiner.*